Nov. 5, 1968  W. R. MACKEY ET AL  3,409,045
COUPLING ASSEMBLY
Filed Nov. 22, 1965  2 Sheets-Sheet 1

INVENTORS
WALLACE REED MACKEY
THOMAS C. BROWN
GENE A. MORGHEIM
BY

Sheridan and Ross
ATTORNEYS

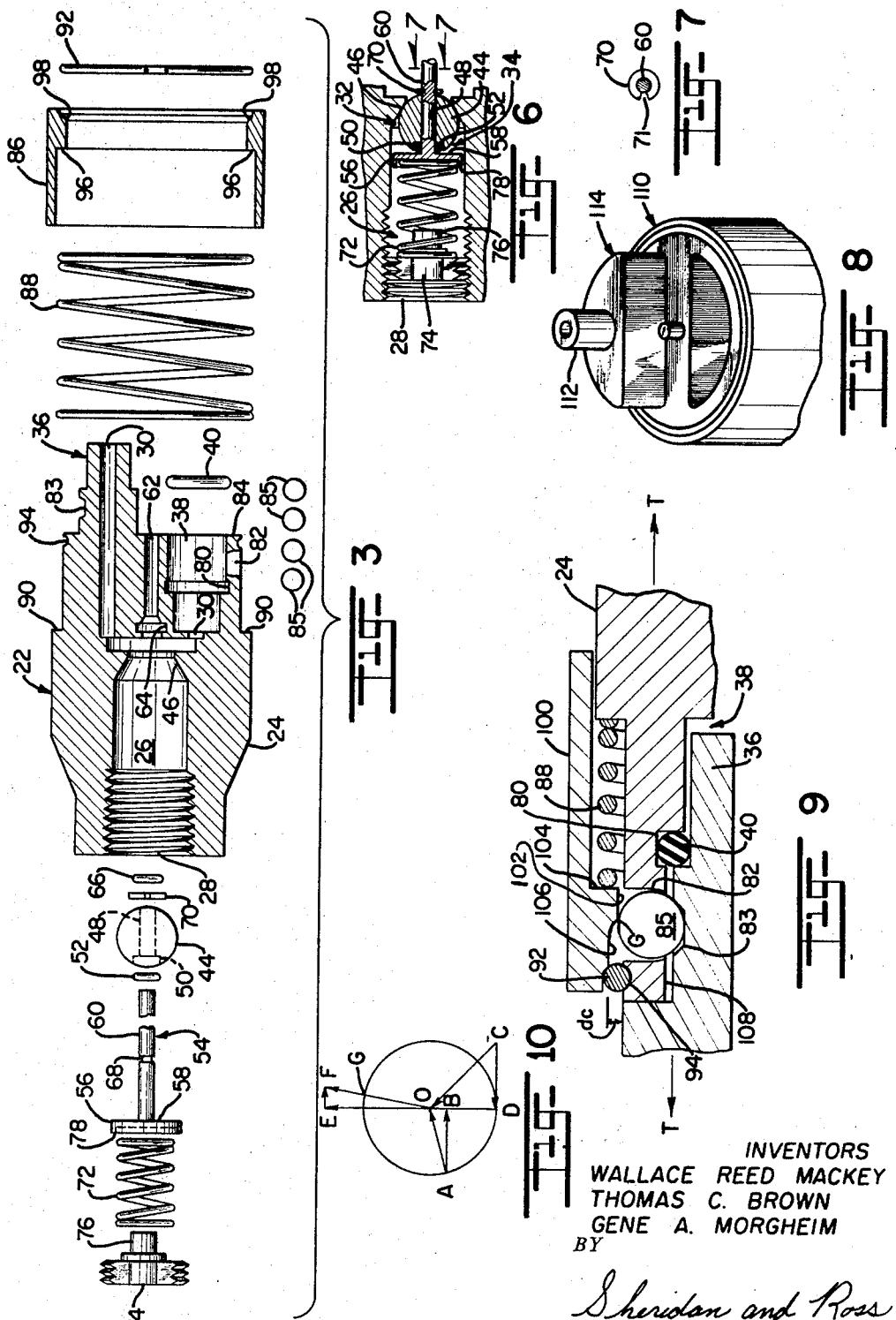

United States Patent Office 3,409,045
Patented Nov. 5, 1968

3,409,045
COUPLING ASSEMBLY
Wallace Reed Mackey, 3801 20th St., and Thomas C. Brown, 2447 12th Ave. Court, both of Greeley, Colo. 80631, and Gene A. Morgheim, 8827 W. 54th Ave., Arvada, Colo. 80002
Filed Nov. 22, 1965, Ser. No. 509,011
2 Claims. (Cl. 137—614.04)

ABSTRACT OF THE DISCLOSURE

A coupling assembly having a pair of substantially identical cooperating units, each unit having complemental male and female portions formed on one end thereof with the male portion of each unit being disposed within the female portion of the other unit, each unit having a passage formed therethrough and disposed in communication with the passage of the other unit, each unit also having a valve means disposed in the passage formed therein, each unit having complemental male and female portions formed on one end thereof, said male portion having a part of said unit's passage formed therethrough, each unit having the male portion thereof disposed within the female portion of the other unit, and said assembly having a pair of substantially identical locking means for interlocking each female portion with the male portion of the other unit. The locking means of the coupling assembly includes means for limiting the amount of tensile force transmitted between said units. Each unit also includes a second valve means for opening said valve means.

This invention relates generally to coupling assemblies and more specificially to coupling assemblies having a pair of substantially identical cooperating units, said assembly having uniquely disposed seal means to minimize or prevent leakage during the coupling and uncoupling of said units; each unit having complemental male and female portions formed on one end thereof with the male portion of each unit being disposed within the female portion of the other said unit, said assembly having a pair of substantially identical locking means for interlocking each female portion with each male portion disposed therein; and said assembly having unique means for opening the valves disposed within each unit thereof. The invention also relates to a coupling assembly having unique means for limiting automatically the amount of force transmitted between a pair of members to permit the uncoupling thereof without damaging either the coupling assembly or the system in which said assembly is mounted.

The coupling assembly art has been extensively developed and many assemblies have been designed and used to good effect. However, prior art coupling assemblies comprising a pair of substantially identical cooperating units have been found to be disadvantageous for a number of reasons. For example, such assemblies did not contain an inexpensive, compact dual locking means, or means for minimizing or entirely eliminating leakage between the units comprising the assembly during the coupling and uncoupling thereof, or means for enabling the opening of the main valve disposed therein under high pressure conditions, or permit automatic uncoupling thereof when the coupling assembly was subjected to a tensile force of sufficient magnitude as to cause substantial damage either to the assembly or the system in which the assembly was mounted or both. It has been found, however, that each of the foregoing disadvantages may be overcome with a device which is inexpensive to manufacture and light weight and compact in construction. More specifically, such disadvantages are overcome through the use of a coupling assembly comprising a pair of substantially identical cooperating units in which each unit has a passage formed therethrough and disposed in communication with the passage of the other said unit, each passage of each unit having an inlet, an outlet and a first valve means disposed intermediate said inlet and said outlet, said first valve means having a passage formed therethrough and being biasedly mounted to a position interrupting communication between said inlet and said outlet, each unit also having second valve means for opening said unit's first valve, said second valve means having a portion thereof extending through a passage formed through said first valve means and having means formed thereon to control the flow of fluid through said passage, each unit having complemental male and female portions formed on one end thereof, said male portion having a portion of said passageway formed therethrough, each unit having a male portion thereof disposed within the female portion and the other said unit, each unit having seal means disposed to maintain continuous sealing engagement between the female portion thereof and the male portion disposed therein for all open positions of both valves of both units, and said assembly having a pair of substantially identical locking means for interlocking each female portion with each male portion disposed therein. Where it is desired or required to uncouple automatically the coupling assembly to prevent damage to the assembly or the system in which the assembly is mounted, the locking means includes a first force transmitting member having an aperture formed therein, a second force transmitting member having a recessed portion formed therein, a biased member mounted for translatory movement in a direction transverse to the longitudinal axis of the aperture formed in said first member, a ball-like member, said first member, in the assembly's force transmitting condition, being disposed intermediate said second member and said biased member, said aperture and recess defining a cavity, said ball-like member being disposed within said cavity, said biased member being disposed with a portion thereof overlying less than half of said ball-like member and confining same in said cavity when a force of less than a predetermined amount is being transmitted by said assembly, said ball-like member being urged against a portion of said biased member to cause said biased member to move in a direction opposite to that in which said member is normally biased upon said assembly transmitting a force equal to or greater than said predetermined amount.

One of the principal objects of this invention is to provide an improved coupling assembly constructed from a pair of substantially identical cooperating units.

Another object of this invention is to provide a means for limiting the amount of force transmitted therethrough.

Another object of this invention is to provide a fluid coupling assembly including means for limiting the amount of tensile force transmitted therethrough.

Another object of this invention is to provide a coupling assembly for fluid lines constructed from a pair of substantially identical cooperating units in which each unit has a main valve disposed therein and said assembly including means for maintaining continuous sealing engagement between said units for all open positions of each valve for each unit.

Another object of this invention is to provide a coupling assembly for fluid lines constructed from a pair of substantially identical cooperating units, each unit having a main valve means and an auxiliary valve means disposed therein, said auxiliary valve means being used to open said main valve.

Another object of this invention is to provide a coupling assembly constructed from substantially identical cooperating units and including a pair of substantially identical locking means interlocking said units.

Another object of this invention is to provide a coupling assembly which is not subjected to adverse wear resulting from vibration and the like.

Another object of this invention is to provide a coupling assembly for fluid lines constructed from a pair of substantially identical cooperating units which may be easily and quickly coupled and uncoupled by an individual although said assembly is mounted within a high pressure system.

Another object of this invention is to provide a coupling assembly for fluid lines, said assembly comprising a pair of identical cooperating units; each unit having a passage formed therethrough and disposed in communication with a passage of the other said unit, each passage of each unit having an inlet, an outlet and a first valve means disposed intermediate said inlet and said outlet, said first valve means having a passage formed therethrough, said first valve means being biasedly mounted to a position interrupting communication between said inlet and said outlet; each unit also having coaxially disposed second valve means for opening said unit's first valve means, said second valve means having a portion thereof extending through the passage formed through said first valve means and having means formed thereon to control the flow of fluid; each unit having complemental male and female portions formed on one end thereof, said male portion having a part of said unit's passage formed therethrough; each unit having a male portion thereof disposed within the female portion of the other said unit; each unit having seal means disposed to maintain continuous sealing engagement between the female portion thereof and the male portion disposed therein for all open positions of both valves of both units; and said assembly having a pair of substantially identical locking means for interlocking each female portion with the male portion disposed therein.

Another object of this invention is to provide a means for limiting the amount of force transmitted between a pair of members, said means comprising a first force transmitting member having an aperture formed therein; a second force transmitting member having a recessed portion formed therein; a biased member mounted for translatory movement in a direction transverse to the longitudinal axis of the aperture formed in said first member; a ball-like member; said first member, in the mean's force transmitting condition, being disposed intermediate said second member and said biased member, said aperture and said recessed portion cooperating to define a cavity, said ball-like member being disposed within said cavity, said biased member being disposed with a portion thereof overlying less than one-half of said ball-like member and confining same in said cavity when a force of less than a predetermined amount is being transmitted by said means, said ball-like member being urged against a portion of said biased member to cause said biased member to move in a direction opposite to that in which said member is normally biased upon transmitting a force between said first and second members that is equal to or greater than said predetermined amount.

Other objects and features of novelty of the invention will become apparent when referring, for a better understanding of the invention, to the following description taken in conjunction with the accompanying drawings, wherein:

FIGURE 3 is an exploded view of the components of one of the units contained within the coupling assembly shown in FIGURES 1 and 2;

FIGURE 6 is an enlarged view of one set of a first and second valve means contained within a coupling assembly constructed in accordance with the subject invention depicting the main valve in the closed condition and the auxiliary valve in the open position;

FIGURE 7 is an enlarged view taken along line 7—7 of FIGURE 6;

FIGURE 8 is a perspective view showing one end of a modified unit constructed in accordance with the subject invention;

FIGURE 9 is an enlarged view of a means for limiting the amount of force transmitted between a pair of members; and FIGURE 10 is a force diagram view showing the forces exerted upon the ball-like member depicted in FIGURE 9 when the parts thereof are transmitting a tensile force less than a predetermined amount.

Figure 1:
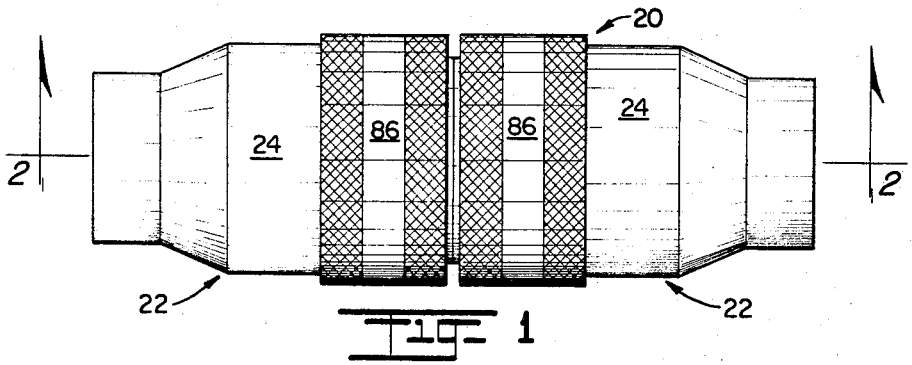
FIGURE 1 is an elevational view of a coupling assembly constructed in accordance with the subject invention.

Referring now to the drawings, in FIGURE 1 is shown a coupling assembly 20 for fluid lines constructed in accordance with the subject invention. Coupling assembly 20 comprises a pair of substantially identical cooperating units 22. The coupling assembly 20 is adapted to be mounted within a fluid system (not shown).

Referring now to FIGURES 2-7, the units 22 are now described. Each unit 22 comprises a housing 24 having a passage 26 formed therethrough, each passage 26 of each unit 22 has an inlet portion 28, an outlet portion 30, and a first or main valve means 32 (see FIGURE 6) and a second or auxiliary valve means 34 disposed intermediate said inlet portion 28 and said outlet portion 30. Each unit 22 also has complemental male 36 and female 38 portions formed on one end thereof. Each male portion has a part of passage 26 formed therethrough and is disposed within the female portion 38 of the other of said units. Each unit 22 has a seal means 40 disposed to maintain continuous sealing engagement between the female portion 38 and the male portion 36 disposed within said female portion for all open positions of both first and second valve means of both units. The coupling assembly 20 also has a pair of substantially identical locking means for interlocking each female portion 38 with the male portion 36 disposed therein.

Referring now to FIGURES 3, 6 and 7, the first or main valve means 32 is shown comprising a spherically shaped member 44 and a valve seat 46 formed on the inner periphery of a reduced diameter portion of the passage 26. Spherically shaped member 44 has a passage 48 formed therethrough. Said passage 48 includes an enlarged portion 50 in which is disposed a seal or O-ring 52. A second or auxiliary valve means 34 includes member 54 which has a portion thereof disposed within the passage 48 of spherically shaped member 44 and has an enlarged portion 56 formed adjacent one end thereof. A valve seat 58 is formed on said enlarged portion 56. Member 54 has an elongated portion 60 which extends through an opening 52 formed coaxially within the housing 24 and intermediate the male portion 36 and the female portion 38. Member 54 also has a peripheral groove 68 formed on the outer surface of elongated portion 60. A snap ring 70 is disposed within the peripheral groove 68. The purpose for this snap ring 70 will be described later. The spherically shaped member 44 is biased toward the valve seat 46 by a spring 72 which is seated upon a "star" member 74, see FIGURES 3 and 15, which is threadedly mounted within the inlet portion 28. Star member 74 has a cylindrical portion 76 extending outwardly from one end thereof. Cylindrical portion 76 acts both as a guide and a retainer for the spring 72. The enlarged portion 56 of member 54 has an annular flange portion 78. One end of the spring 72 is disposed within said flange portion 78.

Each female portion 38 has a peripheral groove 80 in which is disposed said seals means 40. Each female portion 38 also has one or more apertures 82 formed in the portion 84 of the housing 24 encompassing said female portion 38, see FIGURE 3. A ball-like member 85 is disposed within said aperture 82. It is to be noted that the diameter of the outer portion of the aperture 82 is formed equal to or greater than the diameter of the ball-like member 85 while the diameter of the inner portion of the aperture 82 is formed less than the diameter of the ball-like member 85. The purpose for forming aperture 82 in this manner is to insure that the ball-like member 85 does not pass completely through aperture 82 and into the female portion 38. Each male portion has a recessed portion or groove 83 formed on a surface part thereof. The purpose for this feature will be later explained. Each unit 22 also has a sleeve member 86 concentrically mounted adjacent one end of the housing 24 to encompass about the aperture 82 and the ball-like member 85 disposed therein. Sleeve like member 86 is mounted for translatory movement axially along the outer surface of the housing 24. The sleeve member 86 is biased by a spring 88 which has one end thereof seated against a radially extending surface portion 90 formed on the outer part of the housing 24, see FIGURE 3. Spring 88 biases the sleeve member 86 to move in a direction toward the end of the male portion 36 and away from radially extending surface portion 90. Sleeve member 86 is maintained on the outer surface of the housing 24 by a snap ring 92 which is disposed within a peripheral groove 94. Peripheral groove 94 is formed about the outer surface of the housing 24 adjacent one end thereof. It is to be noted that the sleeve member 86 contains a radially extending surface portion 96 and that one end of spring 88 is disposed in abutting engagement against said surface portion 96.

The assembly of the unit 22 shown in FIGURE 3 is now described. The O-ring 52 is inserted in the enlarged portion 50 of the passage 48 formed through spherically shaped member 44. The assembled seal 52 and spherically shaped member 44 is then mounted upon the elongated portion 60 of member 54 with the seal 52 in contacting engagement with the valve seat 58 formed on the enlarged portion 56 of member 54. The snap ring 70 is then mounted within the peripheral groove 68 formed on the outer surface of the elongated portion 60 of member 54. Next, the seal or O-ring 66 is inserted within the enlarged portion 64 of the opening 62. The assembled members 54, snap ring 70, seal 52 and spherically shaped member 44 are then inserted into the inlet 28 and the elongated portion 60 of member 54 is mounted within the opening 62 and has one end thereof extending outwardly from the right end of the unit as viewed in FIGURE 3. The spring 72 is then mounted upon the cylindrical portion 76 of the star member 74 and the assembled spring of star member 74 is then threadedly mounted within the inlet portion 28 of the passage 26 until a predetermined amount of bias force is exerted against the member 54 and spherically shaped member 44. The seal means 40 is inserted within the peripheral groove 80 formed in the female portion 38. Each of the ball-like members 85 are inserted within a corresponding one of the apertures 82. During the installation of the ball-like members 85 within the apertures 82, the large diameter portion of the aperture 82 is positioned above the small diameter portion of said aperture 82. The unit 22 is maintained in this position while the spring 88 is slipped over the right end of the unit 22 as viewed in FIGURE 3 and then the sleeve member 86 is likewise mounted about the right end of the unit as viewed in FIGURE 3. The snap ring 92 is then inserted within the peripheral groove 94 to maintain the spring 88 and the sleeve member 86 about the unit 22.

The coupling of a pair of units assembled as described above is now described. Each of the units are aligned with respect to the other said unit such that the male portion 36 of one of the units is disposed within the female portion 38 of the other said unit. As result of using a unit having complemental male and female portions formed on one end thereof, such units when intercoupled do not undergo any relative movement one with respect to the other and thus do not experience any adverse wear between the contacting parts which would otherwise occur as a result of the effects of vibration encountered in many fluid systems applications such as is encountered in hydraulically actuated farming equipment. Each sleeve member 86 of each unit 22 is retracted, i.e., each sleeve member moves in a direction to further compress its corresponding spring 88, and the units are then moved toward each other until the opposed ends thereof are in abutting contact. At this point, the sleeve members 86 are released and under the force of the energy contained within the compressed springs 88, said sleeve members move toward each other thereby forcing the ball-like members 85 into their respective cavities which are defined by the apertures 82 and the recessed portion 83 formed on the outer part of the male portion 36 wherein, when two units are assembled as described, said recess portion is disposed opposite said aperture 82. Thus, upon releasing the retracted sleeve members 86, it will be readily apparent that the chamfered portion 98 formed on the inner periphery of each sleeve member 86 adjacent one end thereof rides up over ball-like members 85 and forces same within the cavity defined by the apertures 82 and the opposed recessed portion 83. An assembly having a sleeve member 86 shown in FIGURES 2 and 3 will remain locked in the assembled condition until both sleeve members are retracted. The mere retracting of only one sleeve member will not unlock the units.

It will be observed that upon initially bringing a pair of units into coupling engagement that the elongated portion 60 of one of the members 54 abuts against the elongated portion 60 of the other member 54. Upon a continued application of pressure, one of the springs 72 is compressed and if pressurized fluid exists upstream of the spherically shaped members 44 associated with the spring 72 concerned, such compression of said spring 72 results in a small amount of pressurized fluid flowing through the passage 48 formed in the associated spherically shaped member 44. As the pressure builds up on the downstream side of the associated spherically shaped member 44, the pressure force tending to hold the spherically shaped member 44 against the valve seat 46 diminishes to a point that an operator may easily force the spherically shaped member 44 out of sealing contact with the valve seat 46 upon a continued application of pressure. Spherically shaped member 44 is urged away from the valve seat 46 by the snap ring 70 coming into abutting contact with the downstream side of the spherically shaped member 44. It will be appreciated that fluid will easily flow up through the passage 48 and past the snap ring 70 even when snap ring 70 is in abutting contact with the downstream side of the spherically shaped member 44 due to the gap 71 existing between the ends of the snap ring 70 and the portion of the peripheral groove 68 disposed opposite said gap or opening 71. It will also be observed that as a result of the spacing of the seal means 40 within the female portion 38 and selecting an appropriate length for the male portion 36, that continuous sealing engagement between the female portion 38 and the male portion 36 is effected prior to the time that the ends of elongated portion 60 of each member 54 come into abutting contact. Thus, as a result of utilizing this particular feature within a coupling assembly constructed in accordance with the subject invention, it will be readily apparent that for all practical purposes there will be no leakage or loss of fluid during the coupling and uncoupling operation. The use of the second or auxiliary valve means 34 is important in equalizing the pressure on both sides of the valve means 32. For example, in many applications hydraulic pressure as high as 500 p.s.i. is encountered. Since the projected area of the spherically shaped member 44 used in many coupling assemblies is approximately 1 square inch, it will be understood that a force of 500 pounds would be required to open each valve means 32. Thus, under such circumstances, it would be impossible for a single individual to couple together two units of a coupling assembly. However, it has been found that with the use of the auxiliary or second valve means 34 as described, the pressure on both sides of the spherically shaped member 44 is substantially equalized and that only a very small force is required to open the valve means 34 and 32 of each unit.

Figure 2:
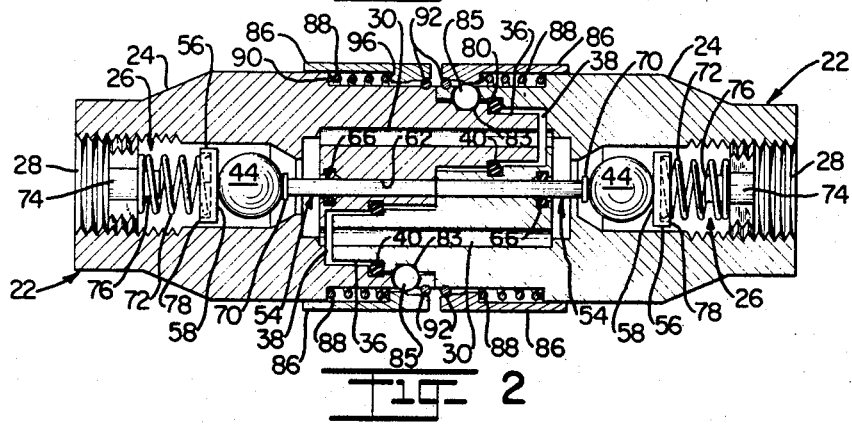
FIGURE 2 is a view in partial cross-section taken along line 2—2 of FIGURE 1.

If desired or required, the locking means shown in FIGURE 2 may be modified to permit an automatic uncoupling of the units upon the application of the predetermined amount of force such as a predetermined amount of tensile force. Referring now to FIGURES 9 and 10, this accomplished by using a sleeve member 100 which has been modified such that the inner surface portion 102 thereof disposed between the radially extending surface portion 96 of sleeve member 86, and one end of the chamfered portion 106 overlies less than one-half of the ball-like member 85. Thus, upon the application of a tensile force T as shown in FIGURES 9, the ball-like member 85 will be subjected to resultant forces AO and CO in the general directions indicated and shown in FIGURE 10. Since the ball-like member 85 is in equilibrium with respect to horizontal movement thereof, the horizonal components AB of the resultant force AO and CD of the resultant force CO must be equal in amount. Thus, the ball-like member, as a result of the application of the tensile force T, is subjected to a vertically directed force, as viewed in FIGURE 10, in the amount equal to OE which represents the sum of the vertical force components BO of resultant force AO and DO of resultant force CO. However, since point G, representing the place of contact between the sleeve member 100 and ball-like member 85 is disposed to the right of a plane which vertically bisects ball-like member 85, a horizontal component EF will be exerted against the sleeve member 100. As the amount of applied tensile force T increases, the amount of the horizontal component EF of the resultant force OF will likewise increase until a point is reached where the amount of the force EF exceeds the amount of the resisting force of the compressed spring 88. At this point, the sleeve member 100 will travel to the right as viewed in FIGURE 9 and the vertical force OF exerted upon the ball-like member 85 will cause the ball-like member 85 to travel upwardly out of the recess portion 82 formed on the outer part of the male portion 36 until the male portion 36 is free to move to the left as viewed in FIGURE 9. It will be observed that the depth "dc" of the chamfer 106 as taken with respect to surface portion 102, must equal or exceed the distance separating the bottom of the recessed portion 83 and the inner surface 108 of the female portion 38. Thus, it will be readily appreciated that through the use of the means shown in FIGURE 9 a coupling assembly may be constructed for limiting the amount of force transmitted between the units thereof and that the amount of force required to uncouple same may be adjusted as desired or required. Consequently, such a coupling assembly may be used to protect the coupling assembly as well as a system in which it is mounted from injury and damage when subjected to large tensile forces.

Figure 4:
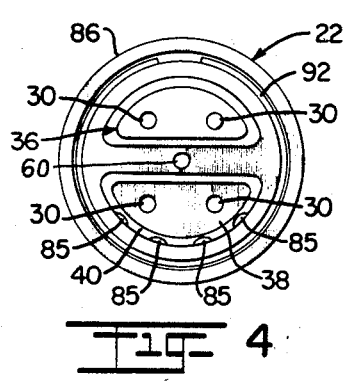
FIGURE 4 is an elevational view of the right end of the left unit shown in FIGURES 1 and 2.
Figure 5:
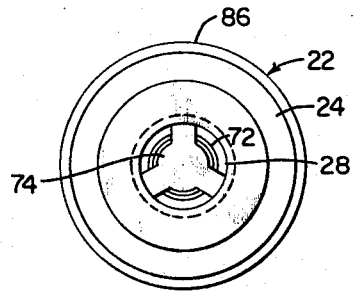
FIGURE 5 is an elevational view of the left end of the left hand unit shown in FIGURES 1 and 2.

Referring now to FIGURE 8, another embodiment of a unit 22 is shown herein. In certain applications, it has been found desirable to use a unit 110 in which the outer part 112 of the male portion 114 is cylindrically shaped rather than semi-cylindrically shaped as shown in FIGURE 4. Except for this modification, the remaining parts and structure of unit 110 is the same as that of unit 22.

From the foregoing, it will be readily apparent that a unique and novel coupling assembly has been described which is both compact and inexpensive to manufacture. Further, such coupling assembly may be easily, quickly and safely used in the field by a single individual. Additionally, such a coupling assembly has, for all practical purposes, eliminated the leakage of fluid during the coupling and uncoupling operation. Such a coupling assembly has also eliminated the problem of excessive wear which occurs as the result of vibrations and the like since neither unit thereof may move relative to the other unit in the unit's assembled condition. Finally, a means has been described for limiting the amount of force that may be transmitted between a pair of members. Such a feature further insures against damage to the means or the system in which it is mounted when said means is subjected to forces exceeding a predetermined amount.

Although the illustrative embodiments of the invention herein set forth have been described in detail to make a full disclosure of the invention, it is to be understood that the particular embodiments described are intended to be illustrative only, and that the various features of the invention may be incorporated in other forms without departing from the spirit and scope of the invention as defined in the subjoined claims.

What we claim is:

1. A coupling assembly for fluid lines, said assembly comprising a pair of substantially identical cooperating units; each unit having a passage formed therethrough and disposed in communication with the passage of the other said unit, each passage of each unit having an inlet, an outlet and a first valve means disposed intermediate said inlet and said outlet, said first valve means having a passage formed therethrough said first valve means being biasedly mounted to a position interrupting communication between said inlet and outlet; each unit also having coaxially disposed second valve means for opening said unit's first valve means, said second valve means having a portion thereof extending through the passage formed through said first valve means and having means formed thereon to control the flow of fluid therethrough; each unit having complemental male and female portions formed on one end thereof, said male portion having a part of said unit's passage formed therethrough: each unit having the male portion thereof disposed within the female portion of the other said unit; each unit having seal means disposed to maintain continuous sealing engagement between the female portion thereof and the male portion disposed therein for all open positions of both valves of both units; and said assembly having a pair of substantially identical locking means for interlocking each female portion with the male portion disposed therein, said locking means including means for limiting the amount of tensile force transmitted between said units; said tensile force limiting means comprising a portion of said housing encompassing the female portion of each unit, said portion of said housing having an aperture formed therein; a recess formed on a part of said male portion of each unit; a biased sleeve member encompassing a portion of said housing, said sleeve member being mounted for translatory movement axially along said unit; and a ball member; said aperture of said housing, in the assembly's assembled condition, being disposed intermediate the recess of said male portion and the biased sleeve member, said aperture and said recess cooperating to define a cavity, said ball member being disposed within said cavity, said biased sleeve member in one position thereof overlying less than one-half of said ball member and confining same in said cavity when a tensile force of less than the predetermined amount is being transmitted between said units; said ball member being urged by the tensile force being transmitted between said units to move against a portion of said biased sleeve member thereby causing said biased sleeve member to move in a direction opposite to that in which said biased sleeve member is normally biased upon said assembly transmitting a tensile force equal to or greater than said predetermined amount.

2. A coupling assembly for fluid lines, said assembly comprising a pair of substantially identical cooperating units; each unit having a passage formed therethrough and disposed in communication with the passage of the other said unit, each passage of each unit having an inlet, an outlet and a valve means disposed intermediate said inlet and said outlet, said valve means being biasedly mounted to a position interrupting communication between said inlet and outlet; each unit having complemental male and female portions formed on one end thereof, said male portion having a part of said unit's passage formed therethrough; each unit having the male portion thereof disposed within the female portion of the other said unit; each unit having seal means disposed to maintain continuous sealing engagement between the female portion thereof and the male portion disposed therein for all open positions of both valves of both units; and said assembly having a pair of substantially identical locking means for interlocking each female portion with the male portion disposed therein, said locking means including means for limiting the amount of tensile force transmitted between said units; said tensile force limiting means comprising a portion of said housing encompassing the female portion of each unit, said portion of said housing having an aperture formed therein; a recess formed on a part of said male portion of each unit; a biased sleeve member encompassing a portion of said housing, said sleeve member being mounted for translatory movement axially along said unit; and a ball member; said aperture of said housing, in the assembly's assembled condition, being disposed intermediate the recess of said male portion and the biased sleeve member, said aperture and said recess cooperating to define a cavity, said biased sleeve member in one position thereof overlying less than one-half of said ball member and confining same in said cavity when a tensile force of less than the predetermined amount is being transmitted between said units; said ball member being urged by the tensile force being transmitted between said units to move against a portion of said biased sleeve member thereby causing said biased sleeve member to move in a direction opposite to that in which said biased sleeve member is normally biased upon said assembly transmitting a tensile force equal to or greater than said predetermined amount.

References Cited

UNITED STATES PATENTS

| 2,033,348 | 3/1936 | Miller | 251—149.7 |
| 2,860,893 | 11/1958 | Clark | 285—1 |
| 3,177,011 | 4/1965 | Ogne | 285—316 |

FOREIGN PATENTS

| 1,156,617 | 10/1963 | Germany. |

WILLIAM F. O'DEA, *Primary Examiner.*

H. M. COHN, *Assistant Examiner.*